March 27, 1962     J. J. SABAITIS     3,026,828
SEED PLANTER
Filed Oct. 27, 1958     2 Sheets-Sheet 1
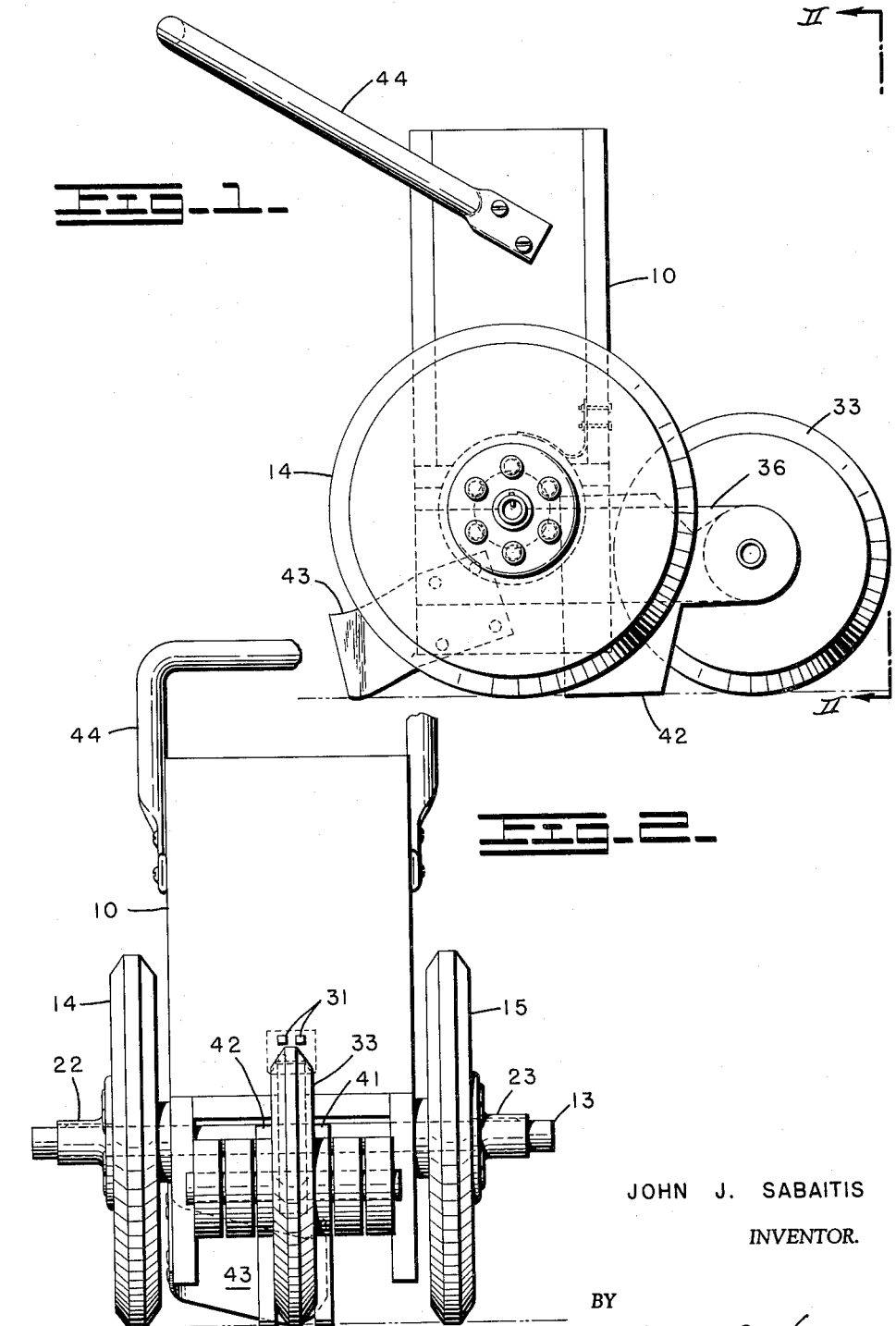
JOHN J. SABAITIS
INVENTOR.
BY

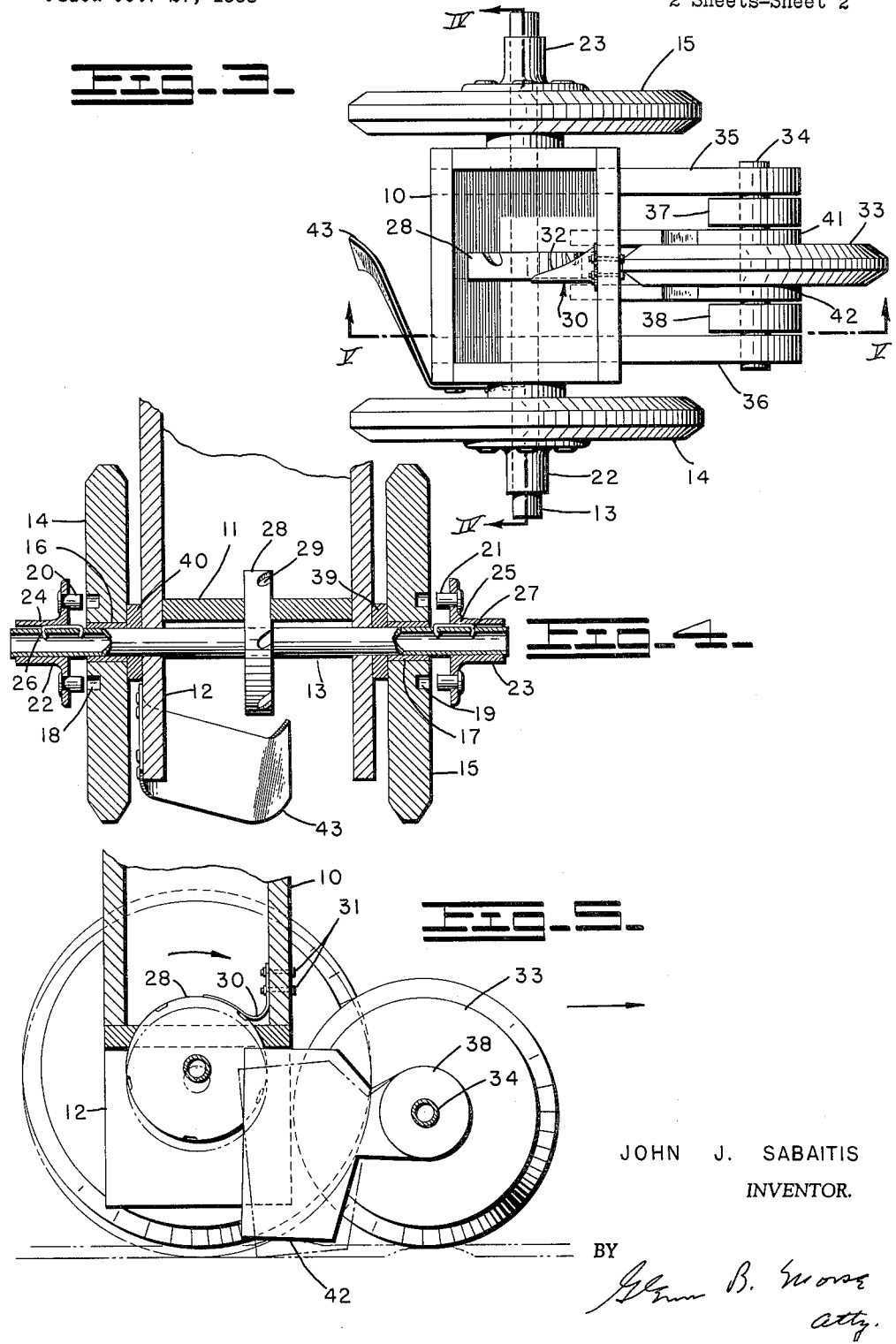

United States Patent Office 3,026,828
Patented Mar. 27, 1962

3,026,828
SEED PLANTER
John J. Sabaitis, Rte. 2, Cedar Springs, Mich.
Filed Oct. 27, 1958, Ser. No. 769,938
2 Claims. (Cl. 111—82)

This invention relates to the construction of seed planters of the type in which a selecting mechanism withdraws seeds individually from a hopper and deposits them at regular intervals along a planting furrow. The invention is centered in the construction of the selecting mechanism, and is in an arrangement for sheltering the seeds in their fall from the machine into the furrow so that they will not be displaced by a side wind or ground irregularity. The structural details of the preferred form of the invention are of such simplicity that the unit can be made by a carpenter of ordinary skill, or it may easily be adapted to a more sophisticated sheet-metal construction.

A rotary selecting wheel is mounted so that it is partially immersed in the bottom area of a hopper. A particular spot on the periphery of the selecting wheel will move in and out of the hopper, and recesses in the periphery are provided for retaining one or a selected number of seeds to be deposited at each planting point along the furrow. As each of these recesses moves through the mass of material in the hopper, it is most likely that more than the desired number of seeds will collect in the recesses and project above them. A deflector is mounted in a position to sweep to the side and out of engagement with the recesses anything which projects. The conformity of the recesses on the wheel, and the configuration of the deflector, are such as to facilitate sweeping the excess seeds to the side in a generally axial direction. The selecting recesses extend to the side of the wheel to permit this axial movement to disengage the seeds from the rotary selecting movement. The result of this operation is not only to measure the seeds accurately, but to prevent any undue projection above the periphery of the wheel which might jam the wheel in the slot in the hopper in which it operates. The wheel necessarily moves within a rather close but freely-moving fit within the hopper to prevent the accidental discharge of seeds between the hopper and the wheel.

As the recesses on the selecting wheel move out of the hopper with the entrapped seeds, a point is reached in which the seeds fall out of engagement with the recesses under the action of gravity. As they drop into the furrow, they are protected in their fall by the presence of a plate disposed on either side of the furrow to shelter the seeds from the effects of wind or foreign objects.

The invention will be analyzed in further detail through a discussion of the particular embodiments illustrated in the accompanying drawings.

In the drawings:

FIGURE 1 presents a side elevation of a simple form of the planter embodying this invention.

FIGURE 2 presents a front elevation of the device shown in FIGURE 1, FIGURE 2 being taken on the plane II—II of FIGURE 1.

FIGURE 3 presents a top view of the device shown in FIGURES 1 and 2.

FIGURE 4 presents a sectional elevation on the plane IV—IV of FIGURE 3.

FIGURE 5 presents a sectional elevation taken on the plane V—V of FIGURE 3.

Referring to the drawings, the illustrated planter includes a hopper structure indicated generally at 10 having a bottom 11 and a lower extension 12 providing for the engagement of the shaft 13. The wheels 14 and 15 are fitted with bearing inserts 16 and 17, respectively, and are provided with a group of recesses as indicated at 18 and 19 in the outer faces of receiving the pins 20 and 21 of the clutch collars 22 and 23. These collars are provided with key ways as shown at 24 and 25 which are engaged by the clips 26 and 27 secured to the tubular shaft 13 to rotatively fix the collars 24 and 25 while still permitting sufficient axial movement to allow for the engagement and disengagement of the pins 20 and 21 from the recesses 18 and 19. When the clutch sleeves are engaged with pins entering into the recesses, movement of the planter along the ground will result in rotation of the wheels and corresponding rotation of shaft 13.

As the shaft turns, the selector wheel 28 is secured to the shaft and moves within a suitable slot on the bottom 11 of the hopper, and each of the recesses as indicated at 29 moves through and out of the hopper as the rotation proceeds. These recesses are normally formed to accommodate a particular number of grains of seed, and are disposed along a somewhat helical orientation with the end of the recess which opens into the side face of the wheel 28 being behind the closed end of the recess, with respect to the direction of rotation of the selector wheel. To prevent an excess number of grains being carried by the wheel into planting position, or in a manner such as might jam the wheel in the opening in the bottom, a deflector member 30 is mounted and formed in such a manner as to overlay and preferably bear gently against the periphery of the selector wheel. In the illustrated embodiment of the invention, the bolts 31 secure this deflector member to the hopper.

Referring particularly to FIGURE 3, the edge 32 of the deflector member is slanted in such a way to urge any projecting grains to the side of the wheel at which the recesses are open. This effect, combined with the shape of the recesses themselves, results in a smooth and non-jamming displacement of the excess grains back into the mass of material within the hopper.

As the seeds drop from their position within the recesses 29, they fall in a furrow formed by the leading wheel 33. This wheel is rotatably mounted on the shaft 34 carried in the brackets 35 and 36 secured to the hopper 10. Spacers 37–40 are provided for determining relationship between the supporting wheels and the lead wheel, and these may be varied to suit the particular needs of the user. The pair of pivoted shelter plates 41 and 42 are also mounted on the shaft 34, and with the lower extremities of these plates normally dragging along the ground. A certain amount of vertical variation is possible in the distance between the ground level and the underside of the hopper, and the pivoting articulation permits the plates to follow the unevenness of the ground and provide a substantially continuous sheltered path from the point of discharge from the selector wheel into the furrow. As the device moves along its path, the blade 43 closes the furrow over the plant seeds. This blade is preferably a sheet of material mounted in cantilever fashion on the hopper 10. The handle 44 may be added to the unit if it is to be pushed by hand, or a group of the units may be operated together with power equipment. In the form of construction illustrated in the drawings, the unit may be conveniently built from wood, with the exception of a few steel pieces such as the tubular shaft 13, the clutch assemblies 22 and 23, the closure blade 43, and also the deflector 30.

The particular embodiments of the present invention which have been illustrated and discussed herein are for illustrative purposes only and are not to be considered as a limitation upon the scope of the appended claims. In these claims, it is my intent to claim the entire invention disclosed herein, except as I am limited by prior art.

I claim:

1. A seed planter comprising: a hopper having an opening in the bottom thereof; a selecting wheel rotatably mounted with respect to said hopper and having the upper portion received in said opening in closely fitted relationship, said selecting wheel having a plurality of spaced recesses in the periphery thereof extending to one side of said wheel, the walls of said recesses being inclined with respect to a plane normal to the axis of said selector wheel in a direction to place the central portion of said recesses in advance of the axially outer portions of said recesses with respect to the normal direction of rotation of said selector wheel; a driving shaft rotatively fixed with respect to said selecting wheel; supporting wheel means rotatably mounted with respect to said hopper; power-transfer means connecting said supporting wheel means and said driving shaft, said supporting wheel means establishing a normal direction of rotation of said selector wheel; deflector means mounted on said hopper opposite said recesses and overlying the portion of said selector wheel traversing said hopper, and having an edge inclined in a direction to induce movement of surplus seeds in said recesses outward to the side of said selecting wheel within said hopper, said deflector including a cantilever member mounted on said hopper and resiliently bearing on the periphery of said selector wheel; furrow-forming means mounted in front of said hopper and in alignment with said selector wheel; and a furrow-closing member mounted on said hopper behind said selector wheel.

2. A seed planter comprising: a hopper having an opening in the bottom thereof; a selecting wheel rotatably mounted with respect to said hopper and having the upper portion received in said opening in closely fitted relationship, said selecting wheel having a plurality of spaced recesses in the periphery thereof extending to a side of said wheel, the walls of said recesses being inclined with respect to a plane normal to the axis of said selector wheel in a direction to place the central portion of said recesses in advance of the trailing side of the said recesses with respect to the normal direction of rotation of said selector wheel; a driving shaft rotatively fixed with respect to said selecting wheel; supporting wheel means rotatably mounted with respect to said hopper; power-transfer means connecting said supporting wheel means and said driving shaft, said supporting wheel means establishing a normal direction of rotation of said selector wheel; deflector means mounted on said hopper opposite said recesses and overlying the portion of said selector wheel traversing said hopper, and having an edge inclined in a direction to induce movement of surplus seeds in said recesses outward to the side of said selecting wheel within said hopper; furrow-forming means mounted in front of said hopper and in alignment with said selector wheel; and a furrow-closing member mounted on said hopper behind said selector wheel.

References Cited in the file of this patent

UNITED STATES PATENTS

| Number | Name | Date |
|---|---|---|
| 229,200 | Tally | June 22, 1880 |
| 720,420 | Gillespie | Feb. 10, 1903 |
| 1,764,218 | Mayfield | June 17, 1930 |
| 2,174,120 | Cobbley | Sept. 26, 1939 |
| 2,302,716 | Riegelsberger et al. | Nov. 24, 1942 |
| 2,496,885 | Milton | Feb. 7, 1950 |
| 2,510,658 | Rassmann | June 6, 1950 |

FOREIGN PATENTS

| 421,368 | Italy | May 22, 1947 |